Dec. 2, 1969 W. H. TWIDALE 3,481,408
MULTIPLE SECTION EARTHWORKING IMPLEMENT
Filed May 25, 1966 3 Sheets-Sheet 1

INVENTOR.
WILLIAM H. TWIDALE
BY
Tweedale & Gerhardt
ATTORNEYS.

Dec. 2, 1969  W. H. TWIDALE  3,481,408
MULTIPLE SECTION EARTHWORKING IMPLEMENT
Filed May 25, 1966  3 Sheets-Sheet 2
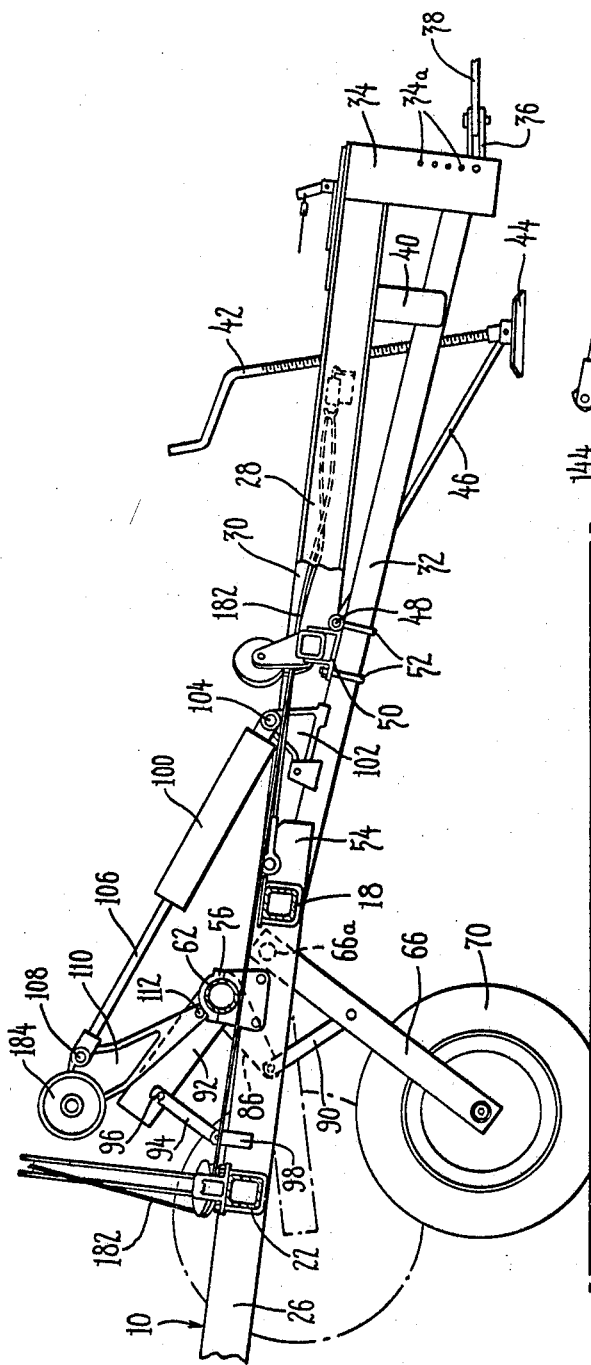
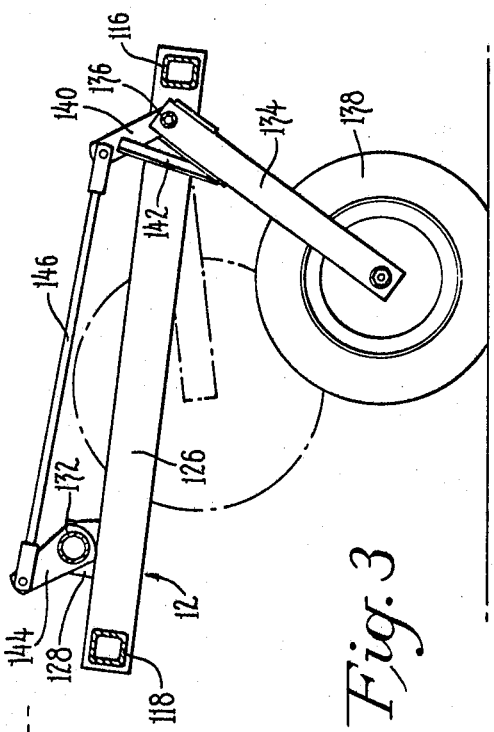
INVENTOR.
WILLIAM H. TWIDALE
BY
Tweedale & Gerhardt
ATTORNEYS.

Dec. 2, 1969 W. H. TWIDALE 3,481,408
MULTIPLE SECTION EARTHWORKING IMPLEMENT
Filed May 25, 1966 3 Sheets-Sheet 3

INVENTOR.
WILLIAM H. TWIDALE
BY
Tweedale & Gerhardt
ATTORNEYS.

United States Patent Office 3,481,408
Patented Dec. 2, 1969

3,481,408
MULTIPLE SECTION EARTHWORKING IMPLEMENT
William H. Twidale, Islington, Ontario, Canada, assignor to Massey-Ferguson Industries Limited, Toronto, Ontario, Canada
Filed May 25, 1966, Ser. No. 552,833
Int. Cl. A01b 49/00, 63/00
U.S. Cl. 172—311          3 Claims

ABSTRACT OF THE DISCLOSURE

An earthworking implement for carrying a large number of earthworking tools which has a main frame with ground engaging wheels supported by a rockshaft carried on the main frame section, auxiliary frame sections pivotally attached to the main frame, ground engaging wheels supported by auxiliary rockshafts carried on the auxiliary frame sections, and an arm with relatively rotatable sections for transmitting motion from the rockshaft carried on the main frame, across the pivotal axis between the main and auxiliary frame sections, to the auxiliary rockshafts.

---

This invention relates generally to earthworking implements and is particularly concerned with multiple section implements for carrying a large number of cultivators, chisel plows, harrows or other earthworking tools.

An implement embodying the invention includes a main frame section having ground engaging wheels supported on a rockshaft carried by the main frame section. The rockshaft may be rotated by means of a rocker arm to raise and lower the main frame wheels relative to the implement which in turn raises and lowers the implement relative to the ground between transport and working positions, the working depth of the tools carried by the implement being determined by the position of the wheels relative to the implement. Actuation of the rocker arm to position the wheels between their transport and working positions is obtained by means of a hydraulic ram adapted to be connected with the hydraulic system of a tractor or other towing vehicle. Pivotally attached to the main frame section are auxiliary frame sections which can be raised and lowered by the hydraulic ram between an extended, operative position and a retracted, folded position relative to the main frame section. Each auxiliary section is provided with a ground engaging wheel supported on an auxiliary rockshaft carried by its associated auxiliary frame section. In order to maintain the working depth of the auxiliary sections the same as that of the main frame section, the rockshaft for the auxiliary ground wheels are connected with the main frame rockshaft through a rigid motion transmitting member which extends across the pivotal axis between the main and auxiliary frame sections to transmit rotation of the main frame rockshaft to the auxiliary rockshaft so that the auxiliary ground wheels are raised and lowered in accordance with the rotation of the main rockshaft. The motion transmitting member has relatively rotatable sections with ball and socket connections at their ends to accommodate pivotal movement between the main frame section and the auxiliary frame sections.

Heretofore, it has been necessary to employ complex cable and pulley arrangements such as in the copending application of William H. Twidale, Ser. No. 395,995, filed Sept. 14, 1964, now Patent No. 3,362,483, the entire disclosure of which is incorporated herein by reference, or by a complex linkage arrangement including multiple rockshafts or motion bars with universal joints to accommodate pivotal movement between the frame section.

The objects and advantages of the invention will become apparent from the following description taken in connection with the accompanying drawings which disclose an embodiment, by way of example, in which:

FIG. 1 is a plan view of an implement embodying the invention;

FIGS. 2 and 3 are sectional elevation views taken on lines 2—2 and 3—3, respectively, of FIG. 1;

Figure 1:
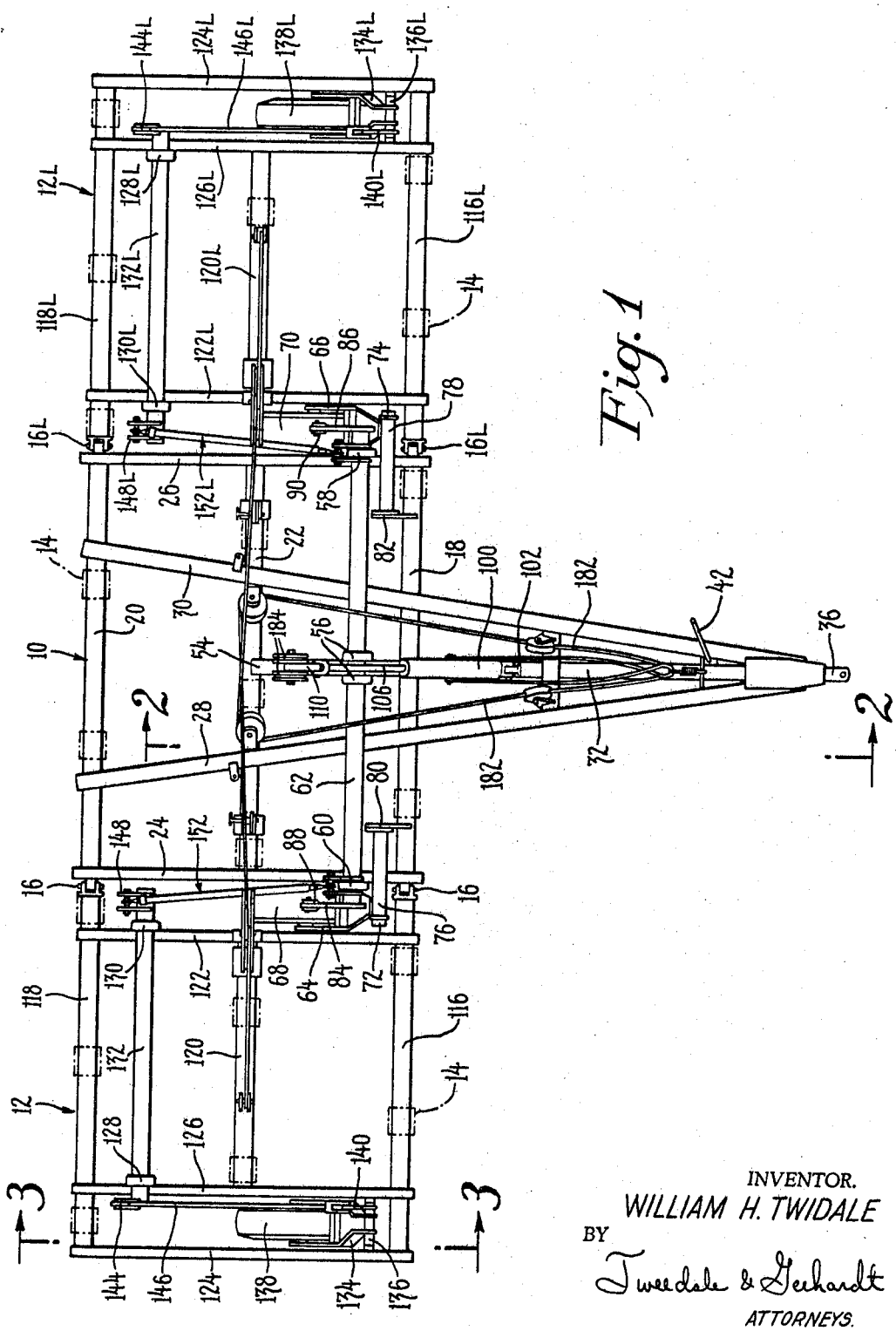

With reference to the drawings, an implement embodying the present invention includes a main frame section 10 having secured to its sides a pair of auxiliary frame sections designated generally by reference numerals 12 and 12L. Since auxiliary frame sections 12 and 12L are identical in construction except for section 12 being mounted at the right of section 10 (as viewed from the rear of the implement), and section 12L being mounted at the left of main frame section 10, only section 12 will be described in detail. Corresponding parts on section 12L and its associated control elements will be identified by the same reference numerals as on section 12 followed by the subscript letter L.

Reference numeral 14 schematically designates earthworking tools secured at various locations as indicated in FIG. 1 on the various frame members by suitable clamps or other mounting devices. Tools 14 may for example be of the type shown in the above referred to copending application Ser. No. 395,995.

Auxiliary sections 12 and 12L are hinged to the sides of main frame section 10 by means of hinge pins 16 and 16L, respectively. Consequently, the auxiliary frame sections can swing upwardly about the hinge pins for transport and storage in a manner to be set forth in detail below.

The main frame section 10 includes a front frame member 18, a rear frame member 20, and a central frame member 22 disposed between and parallel to front and rear frame members 18 and 20, respectively. Frame members 18, 20 and 22 are secured together at their ends by side frame members 24 and 26. Extending forwardly from rear frame member 20 are converging hitch frame members 28 and 30, and a hitch member 34 formed with a vertical groove is mounted at the forward ends of the converging members 28 and 30. Extending forwardly and downwardly from front frame member 18 is a hitch frame member 32 (FIG. 2) which is secured to member 34 and to members 28 and 30 by means of plate members 40.

Mounted on the hitch member 34 is a clevis 36 for attaching the implement to the drawbar 38 of a tractor or similar towing vehicle (FIG. 2). The position of clevis 36 on hitch member 34 may be selectively adjusted by means of a vertically disposed series of holes 34a in member 34.

A screw jack 42 is threadedly mounted in a suitable bracket on hitch frame member 30 for supporting the front end of the implement when it is not in use. Pivotally mounted on the lower end of jack 42 is a support plate 44 and a stabilizing bar 46 has its lower end pivoted to support plate 44. The upper end of bar 46 is pivoted at 48 to a bracket 50 secured by U-bolts 52 to hitch frame member 32.

Supported between frame members 18 and 22 and extending in a fore and aft direction parallel to side frame members 24 and 26 is a beam or frame member 54.

Mounted on each side of beam 54 intermediate its ends is a pair of bearing members 56. Similar bearing members 58 and 60 are mounted, respectively, on side frame members 26 and 24 in axial alignment with bearing members 56. A transverse rockshaft 62 is journalled for rotation in the bearing members 56, 58 and 60.

Pivoted on the main frame section is a pair of forks 64 and 66 for carrying main wheels 68 and 70, respectively. Forks 64 and 66 are pivotally mounted on brackets 72 and 74 carried at the ends of support bars 76 and 78, respectively (FIG. 1). Bars 76 and 78 are secured to the front frame member 18 by means of plates 80 and 82 and project laterally across side frame members 24 and 26 to which they are also secured as by welding or other suitable means.

Rockshaft 62 has secured to its ends crank arms 84 and 86 which are connected with forks 64 and 66, respectively, by means of links 88 and 90, respectively. By rotating rockshaft 62 about its longitudinal axis, crank arms 86 cause forks 66 to swing about pivots 66a (FIG. 2) to raise and lower wheels 68 and 70 relative to the implement frame.

Non-rotatably secured to rockshaft 62 between the bearings 56 is a rocker arm 92 for rotating the rockshaft 62 to raise and lower wheels 68 and 70. Counterclockwise rotation of rocker arm 92 tends to move wheels 68 and 70 downwardly with respect to the frame and raise the implement relative to the ground, and conversely, clockwise rotation of rocker arm 92 raises wheels 68 and 70 relative to the implement to in turn lower the implement relative to the ground.

In the full-line position of wheels 70 in FIG. 2, rocker arm 92 is in the transport position in which the earthworking tools carried by the implement are raised above the ground. Wheels 70, in the transport position, are in their extreme lower position relative to frame 10. For transport, rocker arm 92 may be locked in the position shown in FIG. 2 by means of a link 94 pivotally mounted to a bracket 98 secured to member 54. Link 94 is slotted at its upper end to engage a pin 96 carried by the rocker arm 92.

The elevating and depth control means for controlling the position of wheels 68 and 70, as well as for controlling the position of the auxiliary frame sections, includes an expansible power element in the form of a hydraulic ram 100, the cylinder of which is pivotally connected by a pin 104 to a bracket 102 secured to hitch frame member 32. Piston rod 106 of ram 100 is pivotally connected by a pin 108 with a force transmitting lever 110 pivotally supported on rocker arm 92 by a pin 112. Ram 100 may be connected with the hydraulic system of the tractor in a conventional manner by hydraulic hoses (not shown).

With reference to FIG. 1, the auxiliary frame section 12 includes transverse front, and rear intermediate frame sections 116, 118 and 120, respectively. The front and rear frame members 116 and 118 are secured together at their ends by side frame members 122 and 124, and intermediate frame member 120 has its outer ends secured to a longitudinally intermediate frame member 126. Mounted on frame members 122 and 126 are bearing members 130 and 128, respectively, which rotatably support an auxiliary rockshaft 132.

Pivotally mounted on a shaft 136 extending between frame members 124 and 126 is a fork 134 which carries an auxiliary wheel 138. With reference to FIG. 3, a crank arm 140 is non-rotatably fixed to shaft 136 and is connected with fork 134 through a brace member 142. Projecting radially from rockshaft 132 and non-rotatably secured thereto is a pair of arms 144 which are linked through a connecting rod 146 with arm 140. Rotation of rockshaft 132 is transmitted through crank arms 144, connecting rod 146 and crank arm 140 to raise and lower wheel 138 relative to the auxiliary frame section 12.

Counterclockwise rotation of crank arm 140 tends to raise the auxiliary frame section 12 relative to the ground, and clockwise movement tends to raise wheel 138 relative to frame 12 which in turn lowers frame 12 relative to the ground.

Fixed to the opposite end of rockshaft 132 from crank arm 144 is a crank member 148 including a pair of spaced, parallel arms. Crank member 148 is connected with a crank member 150, also having a pair of spaced, parallel arms, on the adjacent end of rockshaft 62 by a motion transmitting member 152. Thus, when rockshaft 62 is rotated by ram 100 to raise the main frame section 10 by lowering wheels 68 and 70 relative to the main frame section, the motion transmitting member 152 turns rockshaft 132 to cause corresponding movement of wheel 138 relative to the auxiliary frame section 12.

Figure 4:
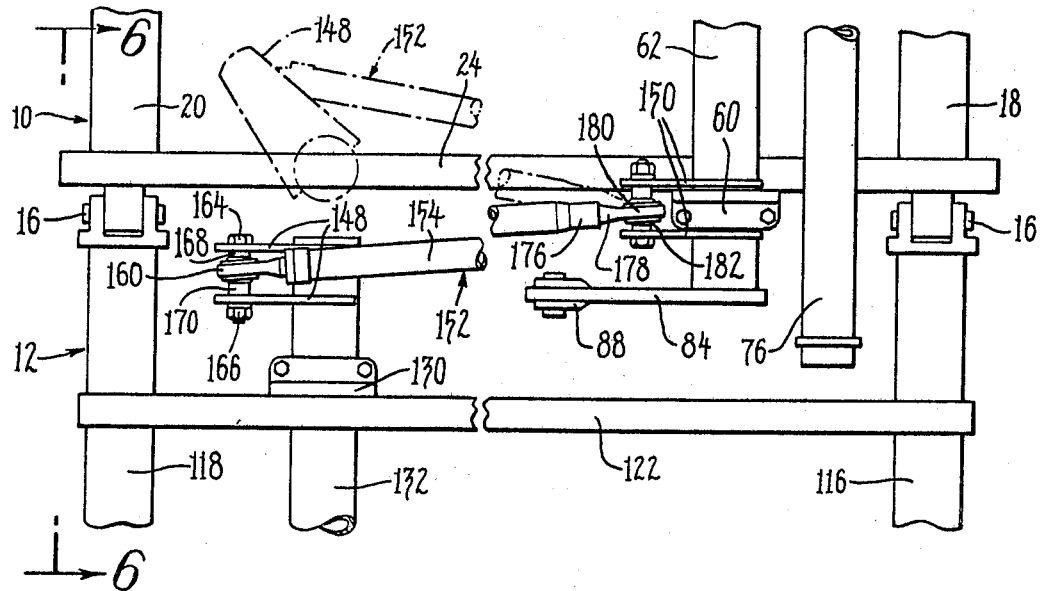
FIG. 4 is an enlarged plan view of a portion of the implement of FIG. 1.
Figure 5:
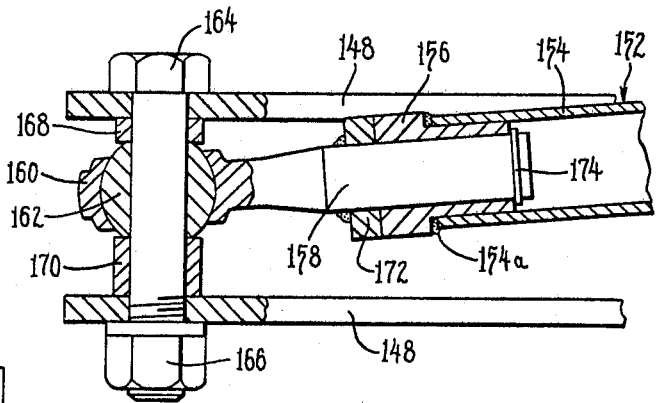
FIG. 5 is an enlarged sectional detail view of one end of the motion transmitting link.
Figure 6:
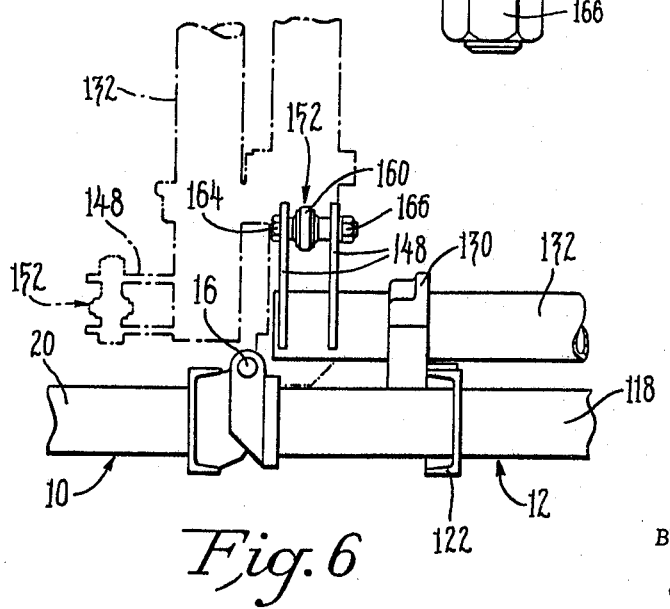
FIG. 6 is a view taken on line 6—6 of FIG. 4.

With reference to FIGS. 4, 5, and 6, the motion transmitting member 152 includes a central section in the form of an elongated tubular member 154. As shown in FIG. 5, a flanged sleeve or bearing member 156 is non-rotatably mounted in the rearward end of the tubular member 154 and is welded to the tube as indicated at 154a. Rotatably mounted in the bearing member 156 is the shank of an end section or connector 158 having an eyelet or socket portion 160 projecting beyond the end of tube 152. Socket portion 160 is formed with a recess having spherical walls which receives a spherical ball 162 mounted between the spaced crank arms 148 on a bolt 164 which is secured to the crank arms by a nut 166. Ball 162 is received on the shank of bolt 164 between spacer members 168 and 170. Secured to the shank portion of connector 158 is a stop member 172 which prevents axial movement toward the left as viewed in FIG. 5 of bearing sleeve 156 relative to connector 158. A snap ring 174 on the end of the shank portion of connector 158 opposite the socket portion 160 prevents axial separation of the connector from member 156.

The opposite end of tube 152 is swaged as shown at 176 to a connector 178 similar to connector 158. Connector 178 has a socket portion 180 mounted on a ball 182 secured between crank arms 150 by an assembly identical with elements 164, 168, 170 etc. As is apparent from FIG. 4, the motion transmitting link 152 extends across the pivotal axis of hinge pins 16 between the frame sections 10 and 12. The pivotal movement between sections 10 and 12 is accommodated by rotation of the tubular portion 154 of link 152 relative to connector 158 as well as by the ball and socket connections at the ends link. Thus, the working depth of frame sections 10 and 12 is simultaneously determined by rotation of the main rockshaft 62 by the hydraulic ram 100.

The auxiliary frame sections can be selectively raised to their transport positions relative to the main frame 10 by connecting cables 182 with pulleys 184 at the end of the force transmitting member 110 as is fully disclosed in the above referred to copending application Ser. No. 395,995.

It will be apparent to those skilled in the art that modifications in the construction and arrangement of parts of the illustrated embodiment can be made without departing from the scope and spirit of the invention.

I claim:

1. In a multiple section implement for supporting earthworking tools including a main frame section main frame ground support means mounted on the main frame section for movement between transport and working positions relative to the main frame section to respectively raise and lower the main frame section relative to the ground such that the position of the main frame ground support means relative to the main frame section determines the working depth of earthworking tools supported on the main frame section, power means connected with the main frame section for actuating the main frame ground support means between its transport and working positions, at least one auxiliary frame section pivotally connected with the main frame section, auxiliary frame ground support means mounted on the auxiliary frame section for movement between transport and working positions relative to the auxiliary frame section to respectively raise and lower the auxiliary frame section relative to the grount to determine the working depth of earthworking tools supported on the auxiliary frame section, and means for actuating the auxiliary frame ground support means between its transport and working positions and maintaining the auxiliary frame section at substantially the same height above the ground as the main frame section, comprising a main rockshaft on the main frame section rotatable to raise and lower the main frame ground support means relative to the main frame sections, an auxiliary rockshaft on the auxiliary frame section rotatable to raise and lower the auxiliary frame ground support means relative to the auxiliary frame section, crank members on said main and auxiliary rockshafts, a motion transmitting member across the pivotal axis between the main and auxiliary frame sections to cause said auxiliary rockshaft to rotate in accordance with rotation of said main rockshaft, and a connecting rod for transmitting motion from the auxiliary rockshaft to the auxiliary frame ground support means wherein said auxiliary frame ground support means comprises an auxiliary wheel support shaft pivotally mounted on said auxiliary frame section and connected to a fork which carries an auxiliary wheel said connecting rod being connected to a crank arm rigidly secured to the auxiliary wheel support shaft.

2. The construction claimed in claim 1 wherein said motion transmitting member includes relatively rotatable sections for accommodating pivotal movement between said main and auxiliary frame sections.

3. The construction claimed in claim 1 wherein said motion transmitting member includes a tubular, central section, an end section having a shank portion rotatably received in the tubular section and having a spherical socket portion projecting from the tubular section, and further including a ball joint element carried by the crank member on the auxiliary rockshaft, said ball member being received in said socket portion.

References Cited

UNITED STATES PATENTS

| | | | |
|---|---|---|---|
| 3,327,787 | 6/1967 | Adee | 172—311 |
| 3,362,483 | 1/1968 | Twidale | 172—311 |
| 3,337,242 | 8/1967 | Richardson | 172—311 |

ROBERT E. PULFREY, Primary Examiner

J. W. PETERSON, Assistant Examiner

U.S. Cl. X.R.

172—456, 669